United States Patent
Takayama

(10) Patent No.: US 6,501,586 B1
(45) Date of Patent: Dec. 31, 2002

(54) OPTICAL SCANNING APPARATUS AND IMAGE-FORMING APPARATUS

(75) Inventor: Hidemi Takayama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 50 days.

(21) Appl. No.: 09/705,724

(22) Filed: Nov. 6, 2000

(30) Foreign Application Priority Data

Nov. 9, 1999 (JP) ............................................. 11-318609
Nov. 2, 2000 (JP) ........................................ 2000-336236

(51) Int. Cl.⁷ ............................................... G02B 26/08
(52) U.S. Cl. ........................ 359/206; 359/216; 347/258; 347/261
(58) Field of Search ................................ 359/196–226, 359/662; 347/256–262

(56) References Cited

U.S. PATENT DOCUMENTS

| | | | |
|---|---|---|---|
| 5,200,611 A | 4/1993 | Hattori | 250/235 |
| 5,489,936 A | 2/1996 | Appel et al. | 347/248 |
| 5,793,515 A * | 8/1998 | Sakikawa | 359/216 |
| 6,313,935 B1 * | 11/2001 | Makino | 359/206 |

FOREIGN PATENT DOCUMENTS

| | | |
|---|---|---|
| EP | 0 601 800 | 6/1994 |
| EP | 0 604 031 | 6/1994 |
| JP | 4-371910 | 12/1992 |
| JP | 5-249399 | 9/1993 |
| JP | 6-59206 | 3/1994 |
| JP | 6-143677 | 5/1994 |
| JP | 9-197315 | 7/1997 |

OTHER PUBLICATIONS

U.S. application No. 09/625,854, filed Jul. 26, 2000.

\* cited by examiner

*Primary Examiner*—James Phan
(74) *Attorney, Agent, or Firm*—Fitzpatrick, Cella, Harper & Scinto

(57) ABSTRACT

Reflected light from a surface not associated with an image is efficiently cut while maintaining rays in a portion associated with formation of an image in a polygon mirror. Among light guided to the polygon mirror by an incidence optical system, a beam indicated by hatching is incident to an fθ lens, is reflected by an unrepresented cylindrical mirror, and forms a spot on the image plane to scan the surface with rotation of the polygon mirror. Since the beam incident to the polygon mirror is greater than the width of polygon facets, there exists a beam reflected by an adjacent facet. In order to intercept this beam, a shield member is placed in a certain determined range between the fθ lens and the facet of the polygon mirror, so as to cut unwanted flare.

14 Claims, 12 Drawing Sheets

OPTICAL SCANNING APPARATUS AND IMAGE-FORMING APPARATUS

BACKGROUND OF THE INVENTION

1. Field of the Invention

The present invention relates to an optical scanning apparatus and, more particularly, to prevention of flare from a scanning mirror in the optical scanning apparatus used in printers in which an image is drawn with laser light.

2. Related Background Art

FIG. 8 is an optical path diagram of a conventional optical scanning apparatus. Reference numeral 91 designates a laser unit, 92 a cylindrical lens, 93 a scanning mirror, 94 a spherical lens, 95 a toric lens, and 96 a photosensitive drum. Parallel laser light emitted from the laser unit 91 is converged only in the sub-scanning direction by the cylindrical lens 92 to impinge on a surface of the scanning mirror 93. The scanning mirror 93 rotates at a constant speed and the light reflected by the scanning mirror 93 travels through the spherical lens 94 and the toric lens 95 to undergo correction for Fθ, whereby converging light scans the surface on the photosensitive drum 96. The photosensitive drum 96 rotates at a constant speed in synchronism with a driving signal of the semiconductor laser and the scanning light forms an electrostatic latent image on the photosensitive drum 96. An image is printed from this electrostatic latent image onto paper by the electrophotographic process.

Recently, there are strong desires for higher definition of image and higher speed of output and there are thus increasing needs to increase the width of the polygon mirror, i.e., to increase the size of the polygon mirror in order to make the Fθ optical system brighter and, in addition thereto, to rotate the polygon mirror at a higher speed. On the other hand, there is a limit to the performance of the motor for rotating the polygon mirror of the thus increased size at the higher speed and the cost for the polygon mirror and motor increases.

Under such circumstances, the scanning efficiency of the polygon mirror is increased by illuminating the polygon mirror with a beam greater than the main scanning width of the polygon mirror (an overfield optical system), for example, as disclosed in Japanese Patent Application Laid-Open No. 6-143677. The scanning efficiency of the polygon can be increased by this method, but there arises a problem that spot sizes are nonuniform depending upon image heights. An effective method for relaxing this nonuniformity is to make the beam incident to the polygon mirror from in a plane made by the rotation axis of the polygon and the optical axis of the fθ lens. This can minimize the nonuniformity of the spot, as compared with that in the case of incidence from other positions, and the spot becomes symmetric with respect to the image heights.

However, if the width of the incident beam is made greater than the width of the reflective facets of the polygon, there will arise a problem that reflected light from an adjacent facet appears as flare at the image plane to deteriorate the image.

An object of the present invention is, therefore, to maintain sufficient rays in the portion of the polygon mirror associated with the formation of image and efficiently intercept the reflected light from the surface not associated with the image.

SUMMARY OF THE INVENTION

In the present invention for accomplishing the above object, in order to efficiently intercept the flare, a distal end of a shield member is located within a predetermined range determined by a diameter $\phi$ of an inscribed circle to the polygon and a focal length f of the fθ lens or the like.

An optical scanning apparatus according to an aspect of the invention is an optical scanning apparatus comprising a scanning mirror having a plurality of reflective facets for deflectively reflecting a first beam emitted from a laser light source and an fθ lens for focusing a second beam deflectively reflected by a reflective facet of said scanning mirror, in a spot shape on an image plane, wherein a width in a main scanning direction of the first beam incident to said scanning mirror is wider than a width of the reflective facets of said scanning mirror in the main scanning direction, said optical scanning apparatus including a shield member for intercepting a third beam reflected by a reflective facet adjacent to the reflective facet deflectively reflecting the second beam.

In the optical scanning apparatus according to another aspect of the invention, the first beam travels through said fθ lens to be incident to said scanning mirror and the first beam incident to the scanning mirror is present within a plane made by a rotation axis of the scanning mirror and the optical axis of the fθ lens.

In the optical scanning apparatus according to another aspect of the invention, where the origin is set at the center of the rotation axis of said scanning mirror, an x-coordinate axis is taken along the optical axis of the first beam of incident rays, the positive direction of the x-coordinate axis is taken along a direction in which the second beam and third beam of reflected rays from the scanning mirror travel, and a y-coordinate axis along the main scanning direction, a distal end of said shield member is located in the range defined by the following equation between the reflective facet of the scanning mirror and a ray output surface of the fθ lens:

$$\alpha x + \beta \leq |y| \leq \alpha' x + \beta' \quad [\text{Eq. 1}]$$

$$\alpha = \tan 2\theta_0$$

$$\beta = (\sec 2\theta_0) \times (a \cos \theta_0 - 2\phi \sin \theta_0)/2$$

$$\alpha' = \tan 2\theta_1$$

$$\beta' = (-\sec 2\theta_1) \times (a \cos \theta_1 + 2\phi \sin \theta_1)/2$$

$$\theta_0 = y_0/2f$$

$$\theta_1 = 2\pi/n - \theta_0$$

$$a = \phi \tan(\pi/n),$$

where n is the number of facets of a polygon being the scanning mirror, f a focal length of the fθ lens, $y_0$ a maximum image height in the main scanning direction, and $\phi$ a diameter of an inscribed circle to the polygon.

In the optical scanning apparatus according to another aspect of the invention, said shield member is means for positioning said fθ lens.

In the optical scanning apparatus according to another aspect of the invention, said shield member is a portion of a lens surface in a noneffective image portion of said fθ lens, said portion being treated by a light-intercepting treatment.

In the optical scanning apparatus according to another aspect of the invention, said shield member is formed so as to be integral with an optical box.

In the optical scanning apparatus according to another aspect of the invention, where the origin is set at the center of the rotation axis of said scanning mirror, an x-coordinate axis is taken along the optical axis of the first beam of incident rays, the positive direction of the x-coordinate axis along a direction in which the second beam and third beam of reflected rays from the scanning mirror travel, and a y-coordinate axis along the main scanning direction, a distal end of said shield member is located in the range defined by the following equation between the fθ lens and said image plane:

$$\alpha x + \beta \leq |y| \leq \alpha' x + \beta' \qquad [\text{Eq. 2}]$$

$$\alpha = 2(2f\theta_0 \cos 2\theta_0 + \phi \sin \theta_0 - x_1 \sin 2\theta_0)/(\cos \theta_0 + 2f \cos 2\theta_0)$$

$$\beta = 2f\theta_0 - [2(f + x_1)(2f\theta_0 \cos 2\theta_0 + \phi \sin \theta_0 - x_1 \sin 2\theta_0)/(\cos \theta_0 + 2f \cos 2\theta_0)]$$

$$\alpha' = 2(2f\theta_1 \cos 2\theta_1 + \phi \sin \theta_1 - x_1 \sin 2\theta_0)/(-\cos \theta_1 + 2f \cos 2\theta_1)$$

$$\beta' = 2f\theta_1 + [2(f + x_1)(2f\theta_1 \cos 2\theta_1 + \phi \sin \theta_1 - x_1 \sin 2\theta_1)/(\cos \theta_1 - 2f \cos 2\theta_1)]$$

$$\theta_0 = y_0/2f$$

$$\theta_1 = 2\pi/n - \theta_0$$

$$a = \phi \tan(\pi/n),$$

where n is the number of facets of a polygon being the scanning mirror, f a focal length of the fθ lens, $y_0$ a maximum image height in the main scanning direction, $\phi$ a diameter of an inscribed circle to the polygon, and $x_1$ a position of a rear principal plane of the fθ lens.

An image-forming apparatus according to a further aspect of the invention is an image-forming apparatus comprising the optical scanning apparatus as set forth, a photosensitive body placed on a surface to be scanned, a developing unit for developing an electrostatic latent image formed on said photosensitive body with the beam under scanning by said optical scanning apparatus, into a toner image, a transfer unit for transferring said developed toner image onto a transfer medium, and a fixing unit for fixing the transferred toner image on the transfer medium.

Another image-forming apparatus according to a further aspect of the invention is an image-forming apparatus comprising the optical scanning apparatus as set forth, and a printer controller for converting code data supplied from an external device, into an image signal and supplying the image signal to said optical scanning apparatus.

DETAILED DESCRIPTION OF THE PREFERRED EMBODIMENTS

The embodiments of the present invention will be described hereinafter with reference to the drawings.

[First Embodiment]

Figure 1:
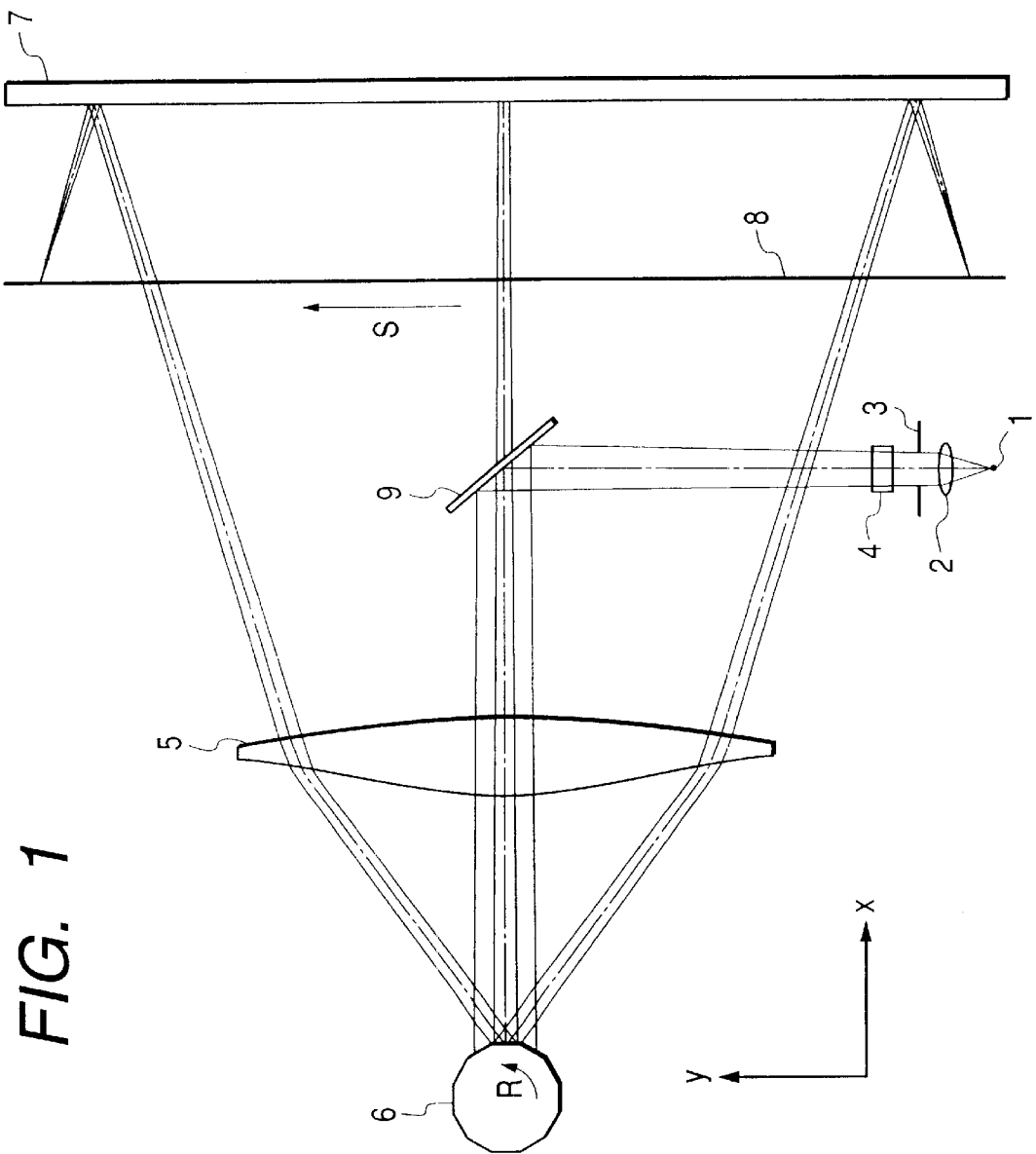
FIG. 1 is an optical path diagram in the main scanning direction of the optical scanning apparatus in the first embodiment of the present invention.

FIG. 1 is an optical path diagram in the main scanning direction of the optical scanning apparatus in the first embodiment.

Figure 2:
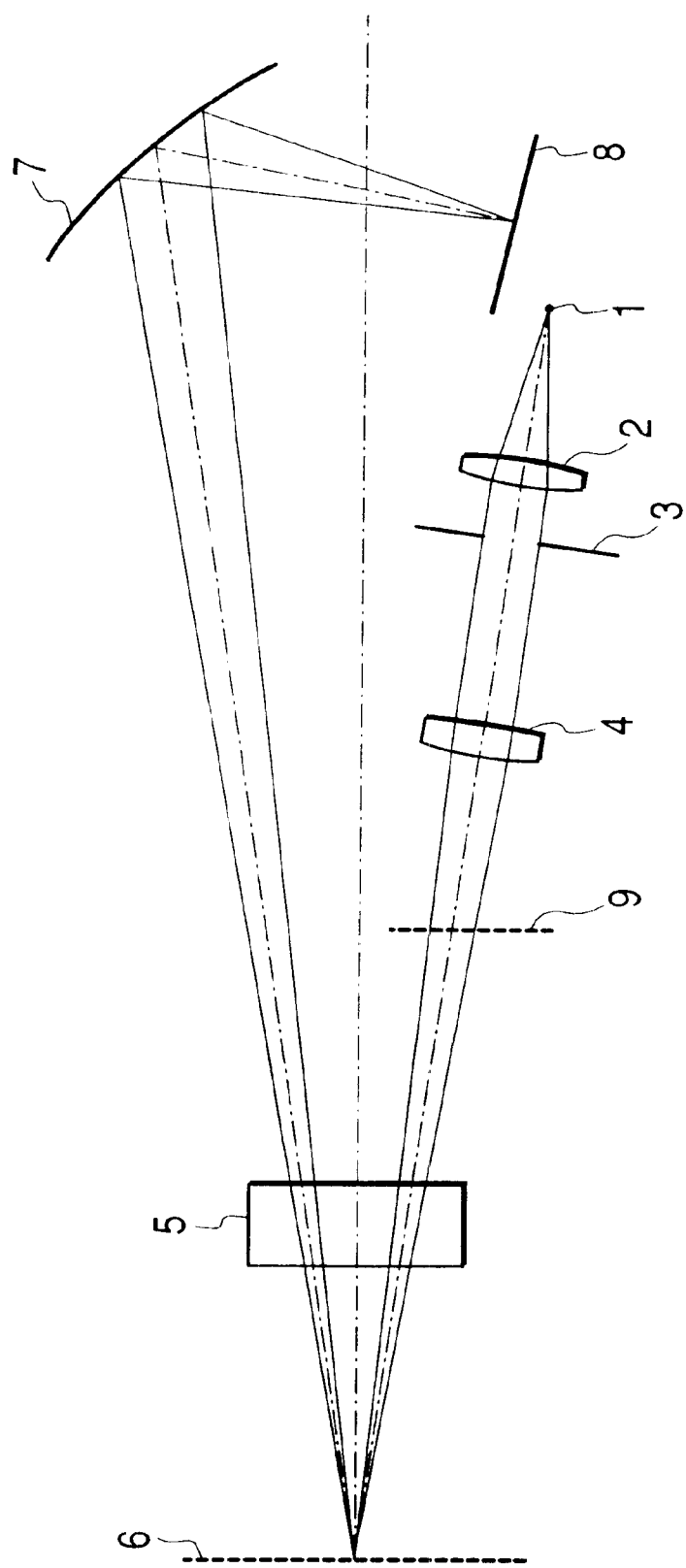
FIG. 2 is an optical path diagram in the sub-scanning direction of the optical scanning apparatus in the firs embodiment.

FIG. 2 is an optical path diagram in the sub-scanning direction of the optical scanning apparatus in the first embodiment.

In FIG. 1 and FIG. 2, reference numeral 1 designates a laser light source, 2 a collimator lens, 3 a stop, 4 a cylindrical lens, 5 an fθ lens, 6 a scanning mirror, 7 a cylindrical mirror, and 8 the image plane such as a photosensitive drum or the like.

The laser light emitted from the laser light source 1 is converted into nearly parallel light by the collimator lens 2 and the beam is restricted by the stop 3. The beam is converged only in the sub-scanning direction by the cylindrical lens 4 and then travels through the fθ lens 5 to be converged on a line near a reflective facet of the scanning mirror. The scanning mirror 6 rotates at a constant speed to deflect the laser light.

Further, the laser light thus deflected is incident again to the fθ lens 5 having the Fθ characteristic and the beam is converged thereby in the main scanning direction. The light emerging from the fθ lens is converged in the sub-scanning direction by the cylindrical mirror 7 having a power in the sub-scanning direction to form a spot on the image plane 8.

Figure 3:
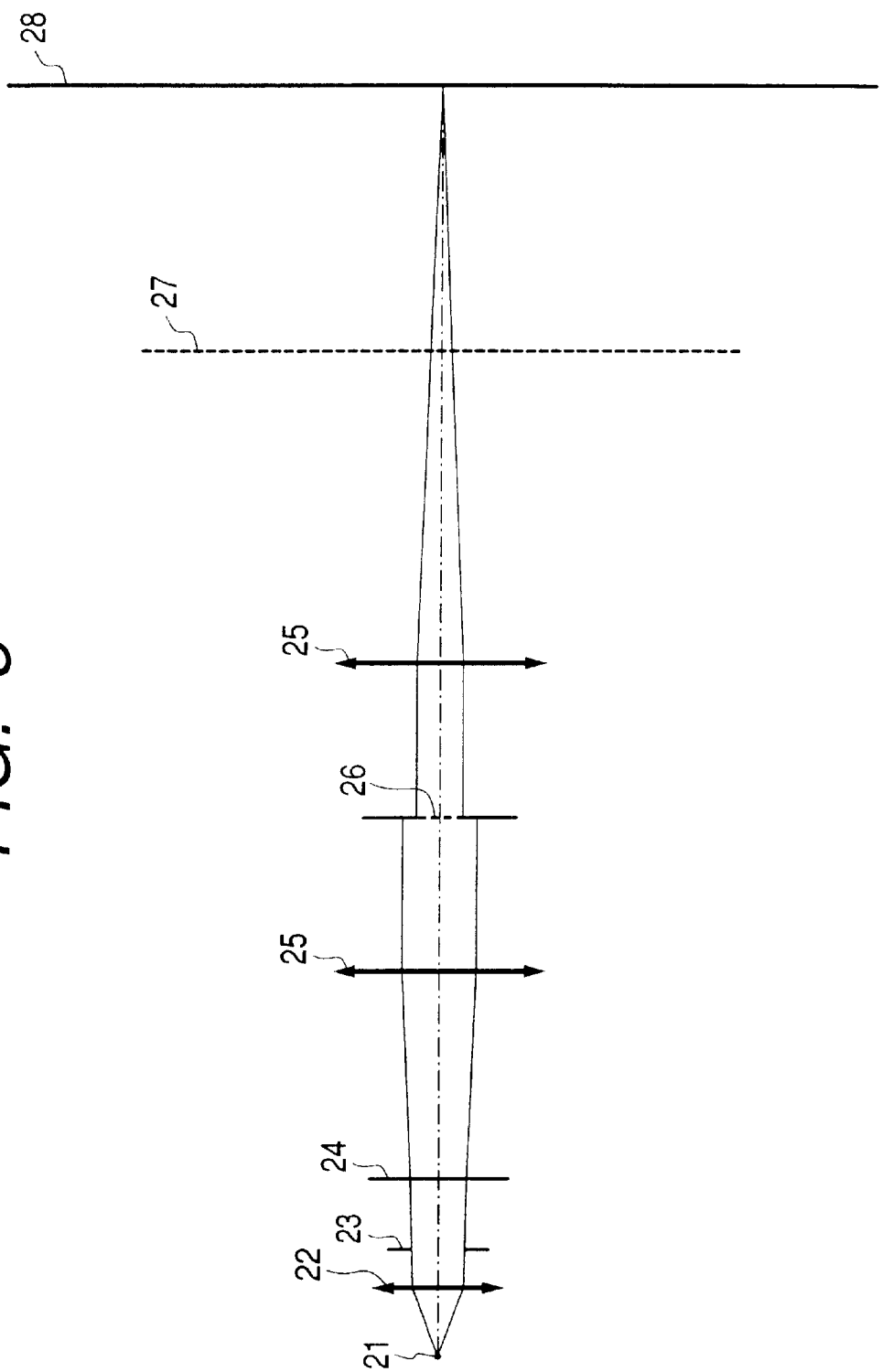
FIG. 3 is a development of optical paths in the main scanning direction of the optical scanning apparatus in the first embodiment.

FIG. 3 is a development of rays in the main scanning direction in the optical scanning apparatus of the first embodiment. Numeral 21 denotes the laser light source, 22 the collimator lens, 23 the stop, 24 the cylindrical lens, 25 the fθ lens, 26 the reflective facet of the scanning mirror, 27 the cylindrical mirror, and 28 the image plane such as the photosensitive drum or the like.

The laser light emitted from the light source 21 is converged into nearly parallel light by the collimator lens 22 and the beam is restricted by the stop 23 to travel through the cylindrical lens 24 having no power in the main scanning direction, into the fθ lens 25. The fθ lens 25 has the power in the main scanning direction to convert the light into a beam further closer to parallel light. The light emerging from the fθ lens 25 is incident to the reflective facet 26 of the polygon mirror to be deflectively reflected in part. The light reflected by the polygon is incident again to the fθ lens 25 to be converged in the main scanning direction. The fθ lens 25 corrects the Fθ characteristic depending upon angles of deflection at the reflective facet of the polygon. Further, the light emerging from the fθ lens is reflected by the cylindrical mirror having no power in the main scanning direction to form a spot on the image plane 28. Since the polygon mirror 26 rotates in the direction of arrow R, the spot on the image plane 8 scans the surface in the direction of arrow S.

Figure 4:
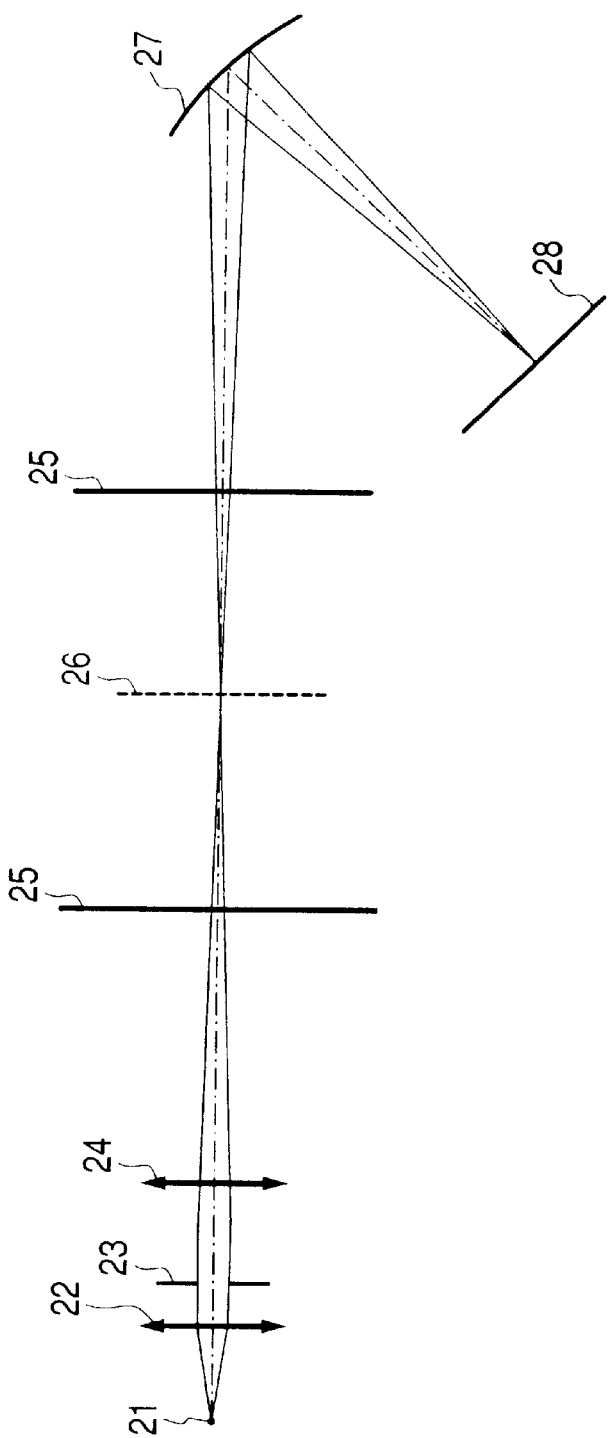
FIG. 4 is a development of optical paths in the sub-scanning direction of the optical scanning apparatus in the first embodiment.

FIG. 4 is a development of rays in the sub-scanning direction in the optical scanning apparatus of the first embodiment. The laser light emitted from the light source 21 is converged into nearly parallel light by the collimator lens 22 and the beam is restricted by the stop 23. The beam determined by the stop 23 is converged in the sub-scanning direction by the cylindrical lens 24 having the power in the sub-scanning direction, travels through the fθ lens having little power in the sub-scanning direction, and thereafter is linearly focused as a linear image elongated in the main scanning direction on the reflective facet 26 of the polygon mirror. The light reflected by the reflective facet 26 of the polygon mirror is incident to the fθ lens 25. The fθ lens 25 has little power in the sub-scanning direction, and the light travels through the fθ lens 25 and thereafter enters the cylindrical mirror 27 having the power in the sub-scanning direction. The light incident to the cylindrical mirror 27 is converged in the sub-scanning direction to form the spot on the image plane 28. Since the polygon mirror 26 and the image plane 28 are in optically conjugate relation herein, the optical system is a tilt correction system wherein there is no deviation of the image position in the sub-scanning direction against tilt of the polygon facet.

Figure 5:
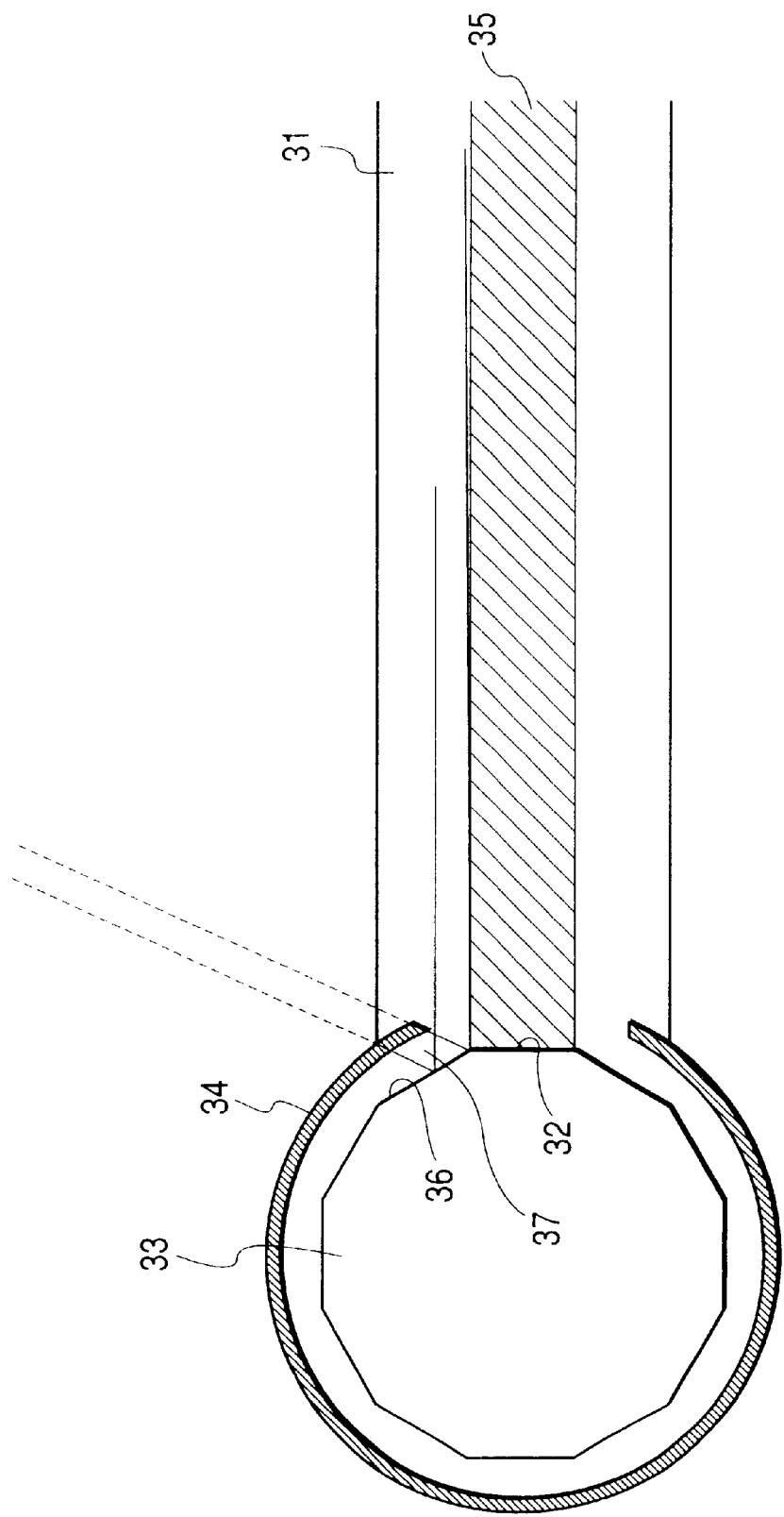
FIG. 5 is an enlarged view of optical paths in the main scanning direction near the scanning mirror of the optical scanning apparatus in the first embodiment.

FIG. 5 is an enlarged view in the main scanning direction of the vicinity of the scanning mirror in the optical scanning apparatus of the first embodiment. Numeral 31 represents a first beam incident to the polygon being the scanning mirror, 32 a reflective facet of the polygon, 33 the polygon, 34 a shield member for cutting flare (third beam), and 35 a beam reflected by the reflective facet 32 and then entering the fθ lens. The second beam 35 indicated by hatching in the beam guided to the reflective facet 32 by the incidence optical system is incident to the fθ lens and is reflected by the unrepresented cylindrical mirror to form the spot on the image plane. Since the beam incident to the polygon 33 is greater than the width of the polygon facets (overfield optical system), there exists the third beam 37 reflected by an adjacent facet 36. This beam 37 will adversely affect the image if it reaches the image plane.

In order to intercept unwanted, reflected light, the shield member 34 surrounds the periphery of the polygon mirror 33 so as to cut the unwanted flare.

The interception of the unwanted flare without intercepting the beam for formation of the image as illustrated can be implemented by placing the shield member in the range limited by the following equation.

$$\alpha x + \beta \leq |y| \leq \alpha' x + \beta' \quad \text{[Eq. 3]}$$

$$\alpha = \tan 2\theta_0$$

$$\beta = (\sec 2\theta_0) \times (a \cos \theta_0 - 2\phi \sin \theta_0)/2$$

$$\alpha' = \tan 2\theta_1$$

$$\beta' = (-\sec 2\theta_1) \times (a \cos \theta_1 + 2\phi \sin \theta_1)/2$$

$$\theta_0 = y_0/2f$$

$$\theta_1 = 2\pi/n - \theta_0$$

$$a = \phi \tan(\pi/n)$$

Here the origin is located at the center of the rotation axis of the polygon, the x-coordinate axis is taken along the optical axis of the first beam of incident rays, the positive direction of the x-axis is taken along the direction in which the reflected light from the polygon travels, and the y-coordinate axis along the main scanning direction. Further, n represents the number of polygon facets, f the focal length of the fθ lens, $y_0$ the maximum image height in the main scanning direction (the outermost ray of the second beam), and φ the diameter of the inscribed circle to the polygon.

Figure 6:
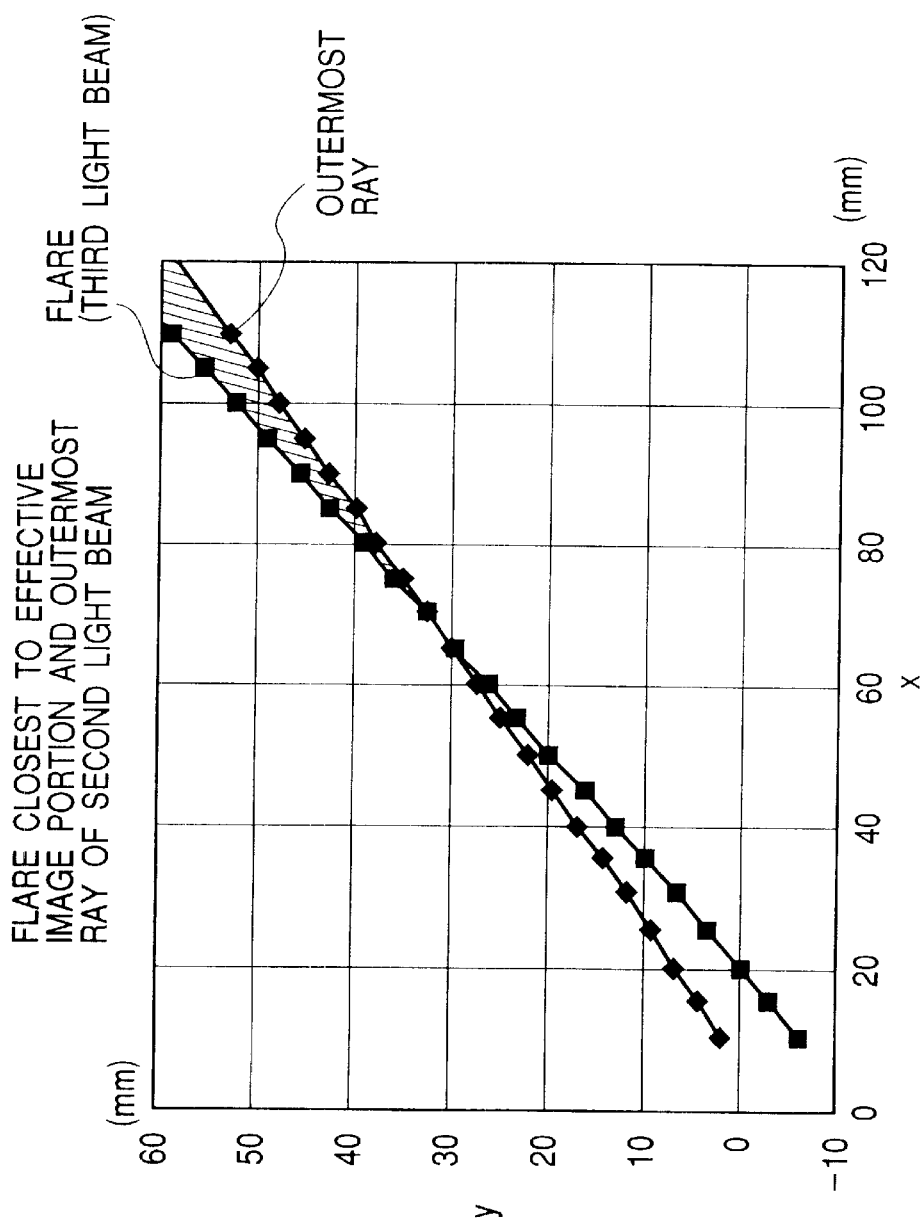
FIG. 6 is a graph to show the range for location of the distal end of the shield member in the optical scanning apparatus of the first embodiment.

FIG. 6 is a graph to show the range of location of the distal end of the shield member. In this graph, as an example, f=318 mm, $|y_0|$=150 mm, φ=26 mm, and n=12. The flare, which can negatively affect the image, can efficiently be cut by placing the distal end of the shield member anywhere in the hatched range of FIG. 6 so as to intercept the light apart from the optical axis.

Figure 9:
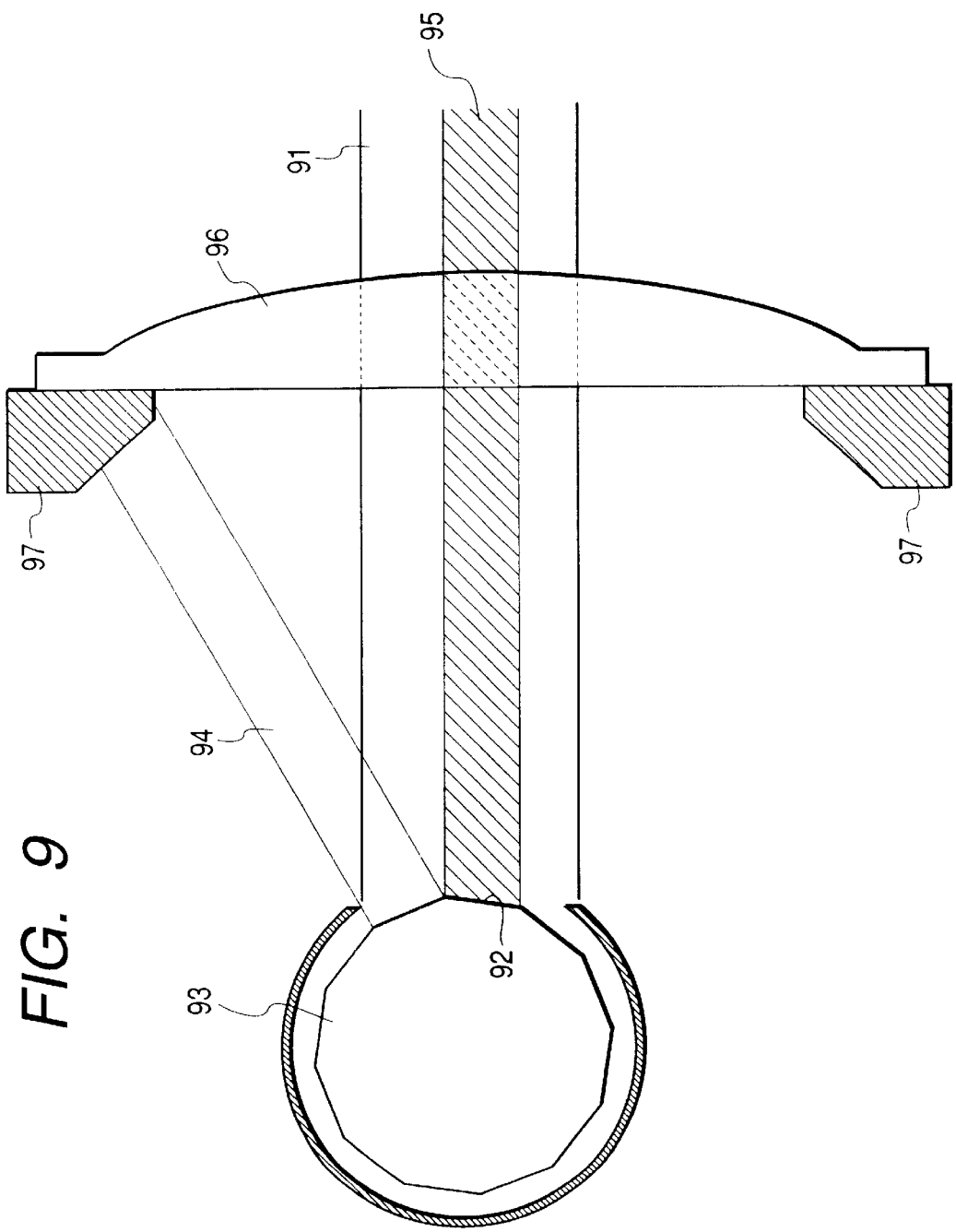
FIG. 9 is an enlarged view of optical paths in the main scanning direction of the optical scanning apparatus in the first embodiment of the present invention.

FIG. 9 is an explanatory diagram to show another shield method of Embodiment 1. In FIG. 9 numeral 91 designates the first beam incident to the polygon mirror, 92 a reflective facet of the polygon mirror, 93 the polygon mirror, 94 the flare being the third beam reflected from a facet adjacent to the facet reflecting the rays associated with the formation of image, and 95 the reflected beam of the second beam, which is the beam reflected by the polygon mirror facet 92, traveling through the fθ lens 96, and thereafter entering the photosensitive drum or the like to form an image thereon. Numeral 96 denotes the fθ lens and 97 a positioning member (mount member) of the fθ lens.

The positioning member (mount member) 97 of the fθ lens with the shield function is placed in the range satisfying above Eq. 3.

As illustrated in FIG. 9, the flare, which is reflected from the adjacent facet to the reflective facet reflecting the beam 95 associated with the formation of image in the polygon 93, can perfectly be cut by constructing the opaque lens positioning member 97 in such a shape as to prevent the flare from reaching the drum surface and as not to intercept the light associated with the formation of image. At this time, the positioning member 97 is desirably one being opaque and preferably giving rise to no reflected light. Normally, in order to process an optical box itself, the material is resin such as opaque polycarbonate or the like, or metal such as aluminum or the like, and in either case it is desirable to stick a flocked sheet thereonto or coat it with an antireflection film, in a sense of preventing the flare from entering the photosensitive drum because of multiple reflection.

Figure 10:
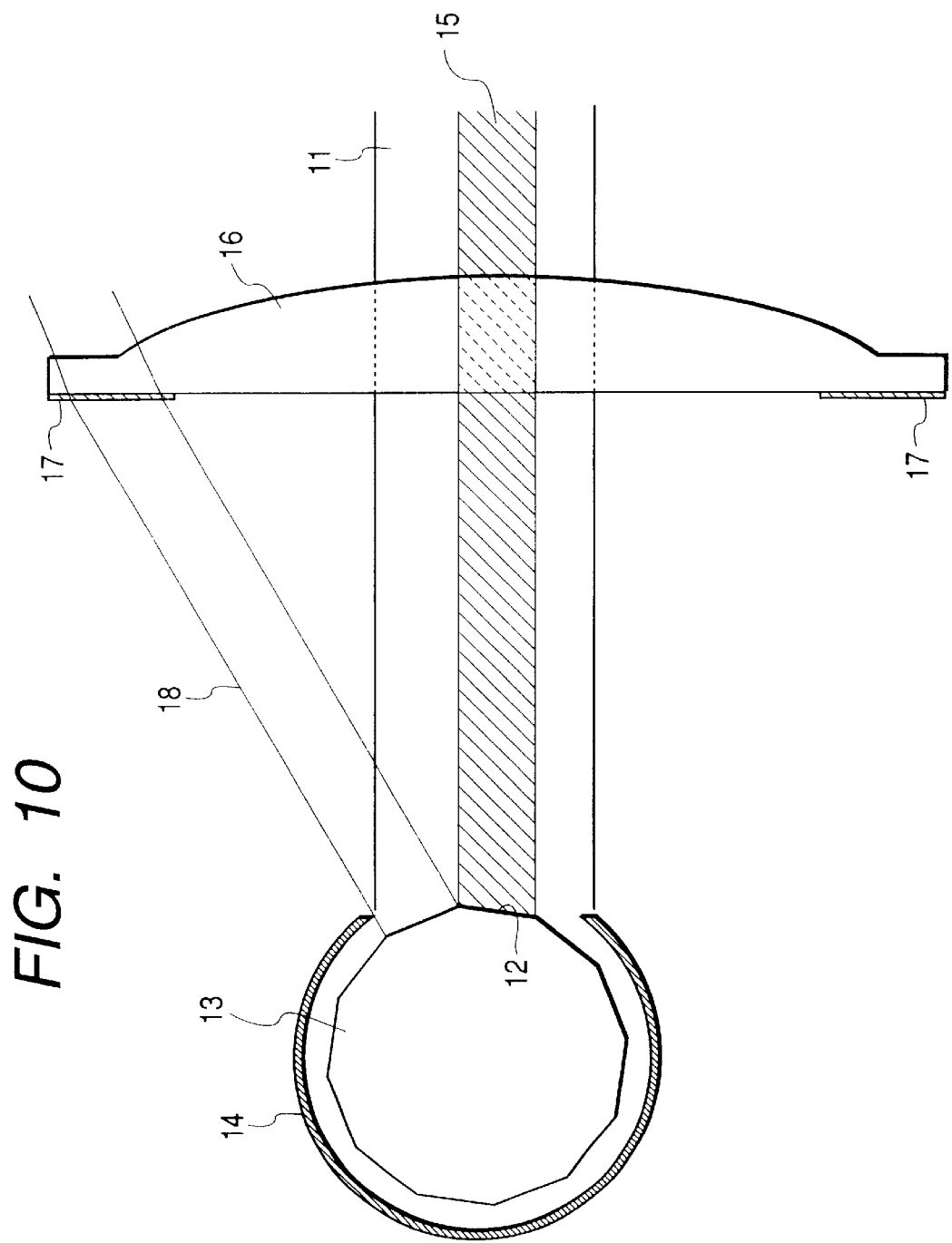
FIG. 10 is an enlarged view of optical paths in the main scanning direction of the optical scanning apparatus in the first embodiment of the present invention.

FIG. 10 is an explanatory diagram to illustrate another shield method of Embodiment 1 of the present invention. In FIG. 10, numeral 11 designates the first beam incident to the polygon mirror, 12 a reflective facet of the polygon mirror, 13 the polygon mirror, 18 the flare being the third beam reflected from the adjacent facet to the facet reflecting the rays associated with the formation of image, and 15 the reflected beam of the second beam, which is the beam reflected by the polygon mirror facet 12, traveling through the fθ lens 16, and thereafter entering the photosensitive drum or the like to form an image thereon.

Numeral 17 denotes a shield film for cutting the unwanted flare without use of an additional member, which is made by forming a roughened surface for shielding in the surface of the lens or by applying an oily black paint for shielding onto the surface.

The shield film 17 is placed in the noneffective image portion in the periphery of the fθ lens 16 and within the range satisfying above Eq. 3.

FIG. 10 shows the treatment for shielding on the entrance side of the lens, but the same effect can also be achieved by placing the shield film on the exit side of the lens. However, if the dimensional accuracy is severe in the optical-axis direction of the lens, the film is desirably placed on the side that is not associated with positioning.

The shield member was placed adjacent to the lens in the present embodiment, but the like effect can also be attained by forming part of the optical box in the shape intercepting the light in the optical path of the flare or by processing a lid of the optical box in the shape intercepting the optical path of the flare. Namely, the shield member of the present invention may also be formed so as to be integral with the optical box.

[Second Embodiment]

Figure 7:
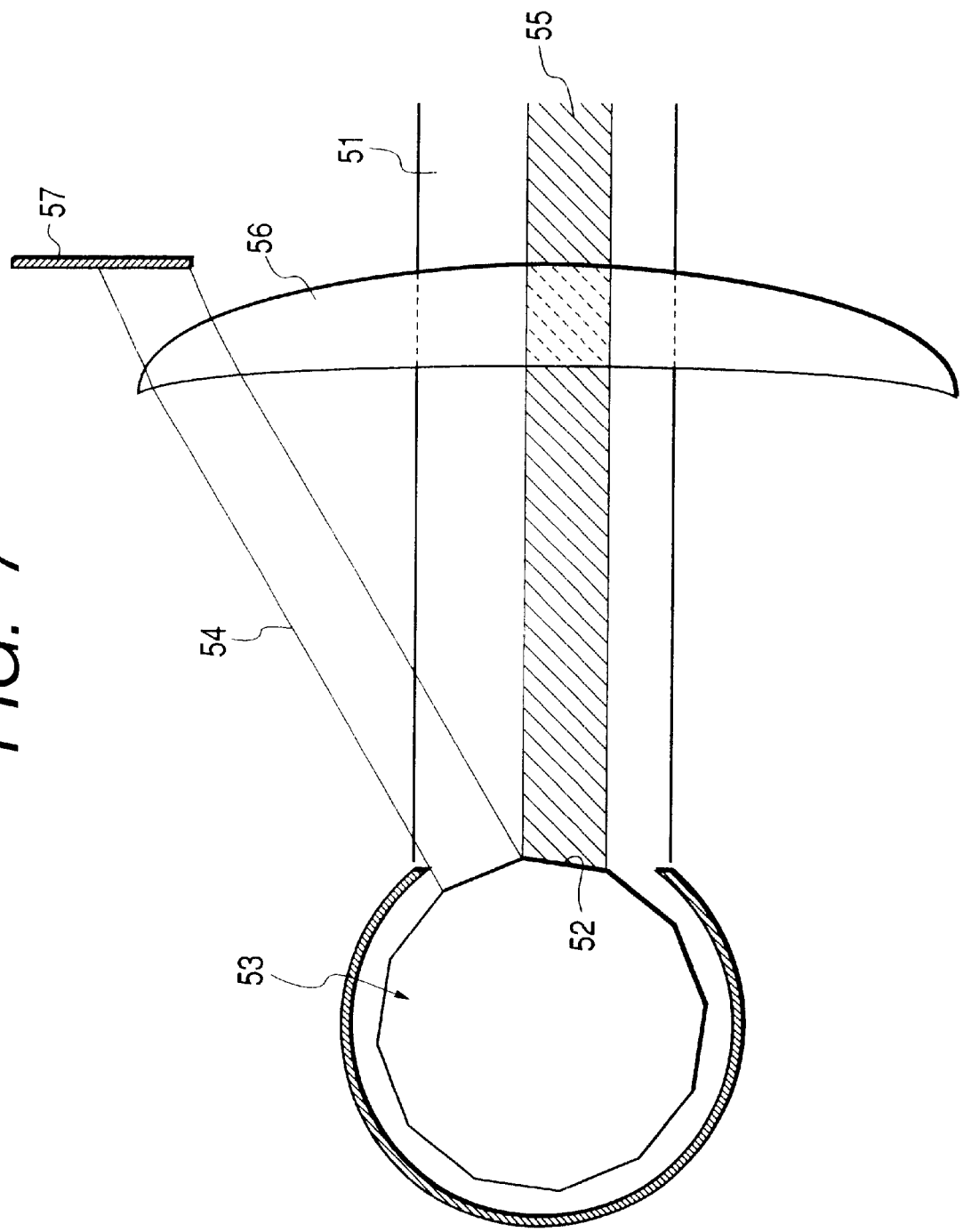
FIG. 7 is an enlarged view of optical paths near the shield member in the optical scanning apparatus of the second embodiment.
Figure 8:
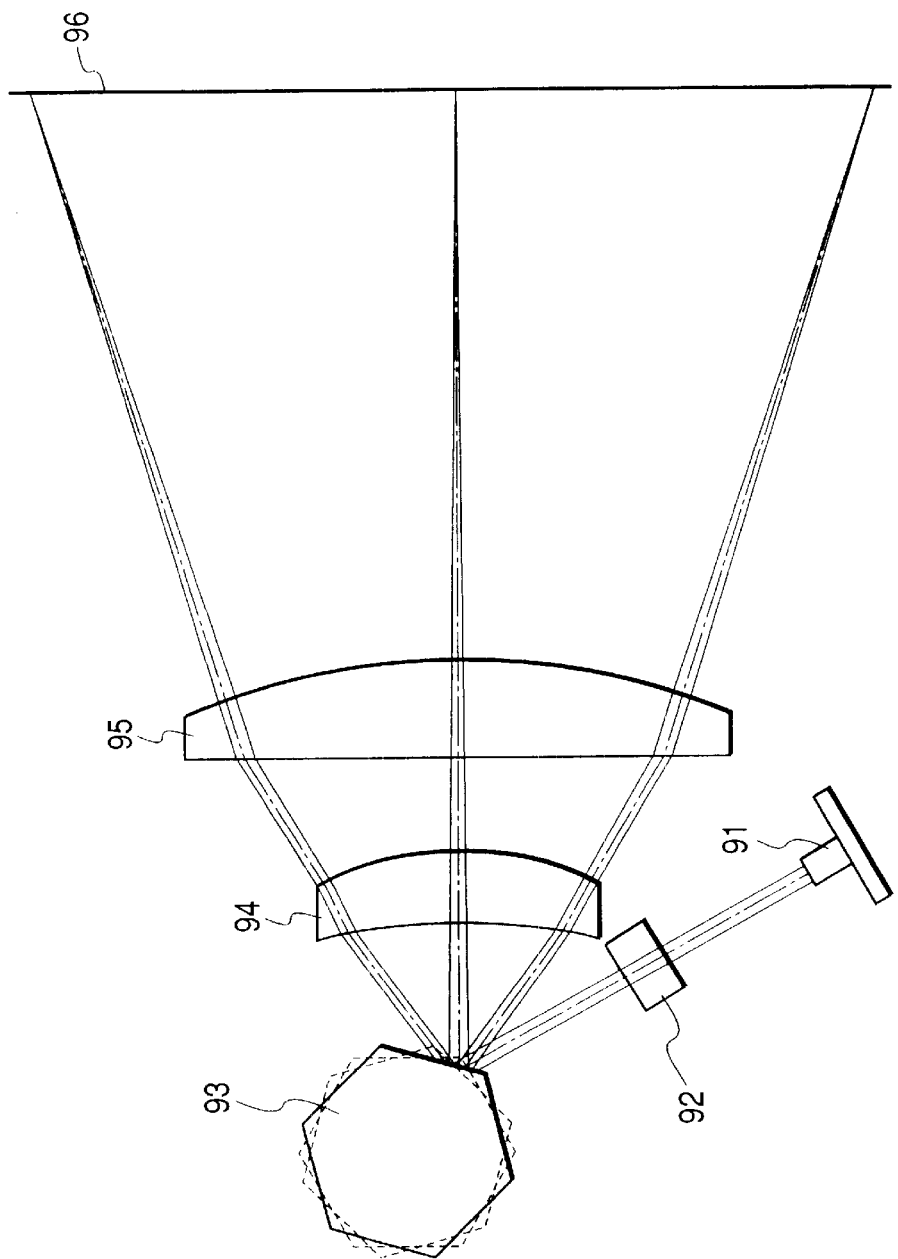
FIG. 8 is an optical path diagram of the conventional scanning optical system.

FIG. 7 is an optical path diagram in the main scanning direction for explaining the position of the shield member in the optical scanning apparatus of the second embodiment. Numeral 51 designates the first beam incident to the polygon mirror, 52 a reflective facet of the polygon mirror, 53 the polygon mirror, 54 the flare (third beam) reflected from a facet adjacent to the facet reflecting the rays associated with the formation of image, 55 the second beam of reflected light, which is the beam reflected by the polygon mirror facet 52, entering the fθ lens, thereafter reflected by the cylinder mirror or the like, and then entering the photosensitive drum or the like to form an image, 56 the fθ lens, and 57 the shield member for cutting the unwanted flare.

Among the light guided to the polygon mirror 52 by the incidence optical system, the beam 55 indicated by hatching is incident to the fθ lens and is reflected by the unrepresented cylindrical mirror to form a spot on the image plane, thereby scanning the image plane with rotation of the polygon mirror. Since the beam incident to the polygon mirror 53 is greater than the width of the polygon facets (overfield optical system), there exists a beam 54 reflected by the adjacent facet. This beam 54 will adversely affect the image if it reaches the image plane. Therefore, the unwanted flare is cut by placing the shield member 57 in a predetermined range between the fθ lens and the photosensitive drum surface in order to intercept the unwanted, reflected light as illustrated in FIG. 7.

It becomes feasible to intercept the unwanted flare without intercepting the beam for formation of image when the shield member is located in the range specified by the following equation.

$$\alpha x + \beta \leq |y| \leq \alpha' x + \beta' \quad [\text{Eq. 4}]$$

$$\alpha = 2(2f\theta_0 \cos 2\theta_0 + \phi \sin \theta_0 - x_1 \sin 2\theta_0)/(\cos \theta_0 + 2f \cos 2\theta_0)$$

$$\beta = 2f\theta_0 - [2(f+x_1)(2f\theta_0 \cos 2\theta_0 + \phi \sin \theta_0 - x_1 \sin 2\theta_0)/(\cos \theta_0 + 2f \cos 2\theta_0)]$$

$$\alpha' = 2(2f\theta_1 \cos 2\theta_1 + \phi \sin \theta_1 - x_1 \sin 2\theta_0)/(-\cos \theta_1 + 2f \cos 2\theta_1)$$

$$\beta' = 2f\theta_1 + [2(f+x_1)(2f\theta_1 \cos 2\theta_1 + \phi \sin \theta_1 - x_1 \sin 2\theta_1)/(\cos \theta_1 - 2f \cos 2\theta_1)]$$

$$\theta_0 = y_0/2f$$

$$\theta_1 = 2\pi/n - \theta_0$$

$$a = \phi \tan(\pi/n)$$

Here the origin is set at the center of the rotation axis of the polygon, the x-coordinate axis is taken along the optical axis of the incident rays, the positive direction of the x-axis along the direction in which the reflected light by the polygon travels, and the y-coordinate axis along the main scanning direction. Further, n indicates the number of polygon facets, f the focal length of the fθ lens, $y_0$ the maximum image height in the main scanning direction, $\phi$ the diameter of the inscribed circle to the polygon, and $x_1$ the position of the rear principal plane of the fθ lens.

Figure 11:
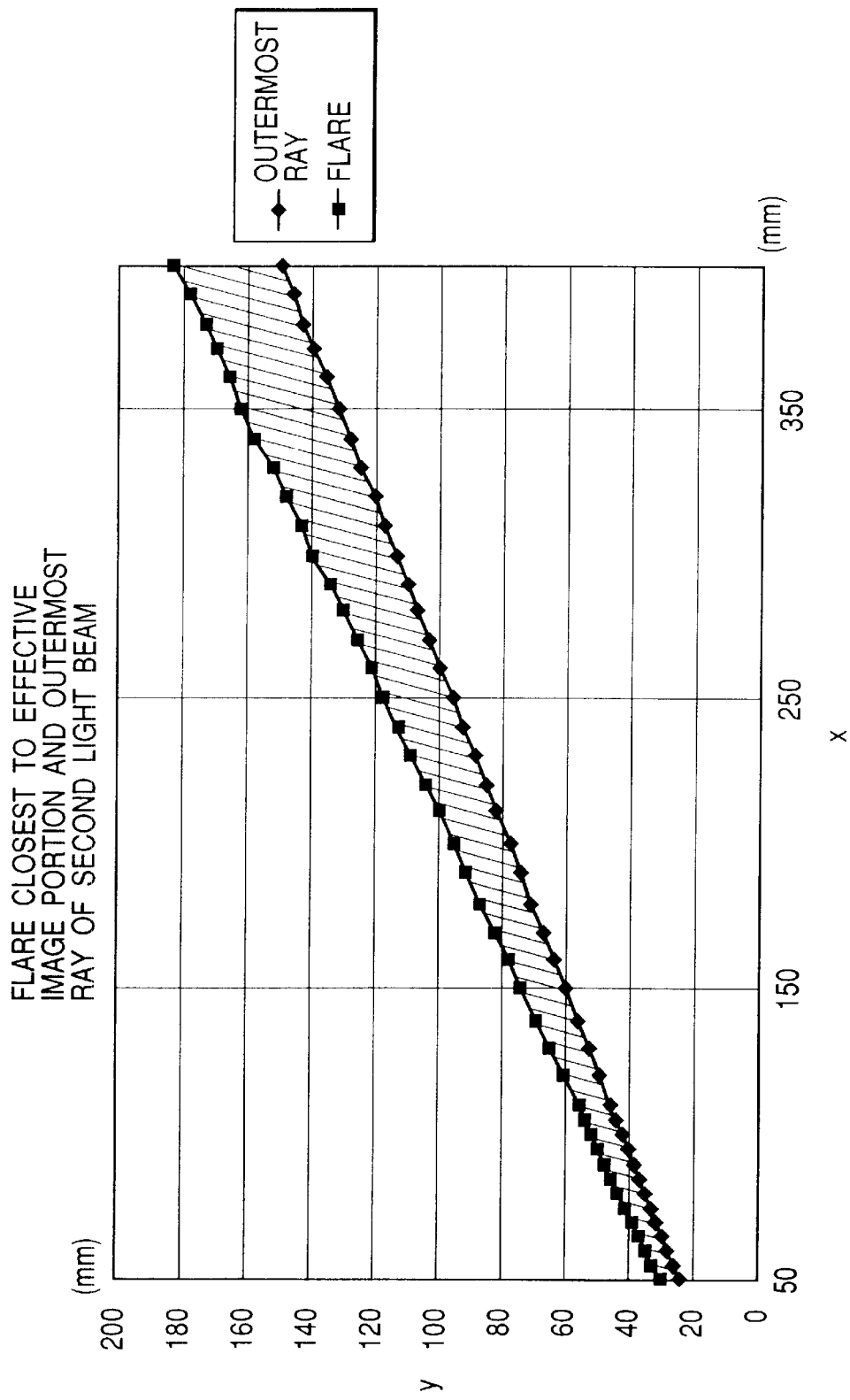
FIG. 11 is a graph to show the range for location of the distal end of the shield member in the optical scanning apparatus of the second embodiment.

FIG. 11 is a graph to show the range in which the distal end of the shield member is to be located. In this graph, as an example, f=318 mm, y=150 mm, $\phi$=26 mm, n=12, and $x_1$=80 mm. The flare, which can adversely affect the image, can efficiently be cut by intercepting the light apart from the optical axis by the tip of the shield member located anywhere in the hatched range of FIG. 11.

This permits the shield member to efficiently intercept the reflected light from the adjacent facet to the facet associated with the image, thereby preventing the reflected light from becoming the flare adversely affecting the image.

Figure 12:
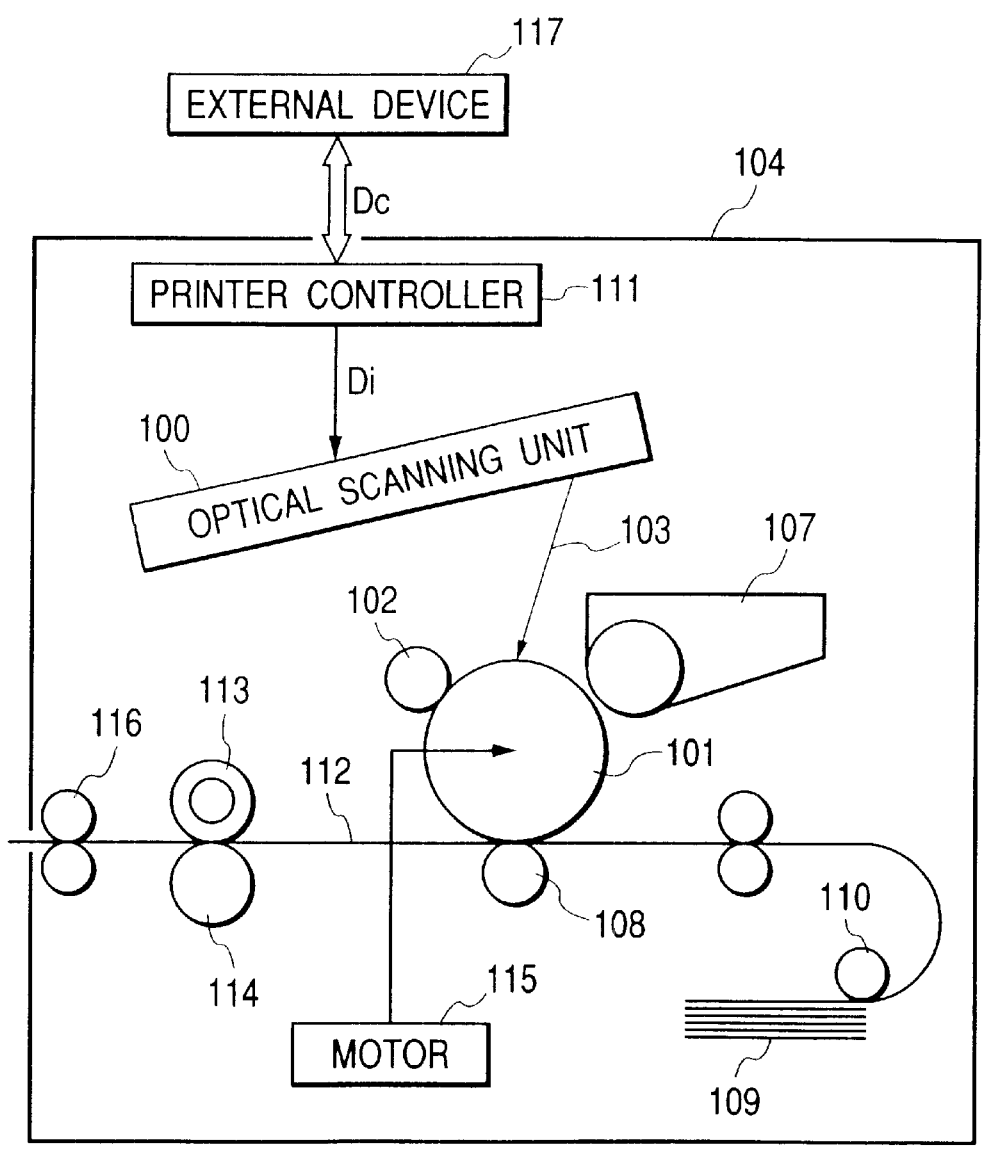
FIG. 12 is a schematic diagram of an image-forming apparatus of the present invention.

FIG. 12 is a cross-sectional view of the principal part along the sub-scanning direction to show an embodiment of the image-forming apparatus of the present invention. In FIG. 12, numeral 104 designates the image-forming apparatus. This image-forming apparatus 104 accepts input of code data Dc from an external device 117 such as a personal computer or the like. This code data Dc is converted into image data (dot data) Di by a printer controller 111 in the apparatus. This image data Di is supplied to an optical scanning unit 100 having the structure as described in either of Embodiments 1 and 2. This optical scanning unit 100 outputs an optical beam 103 modulated according to the image data Di and this light beam 103 scans a photosensitive surface of photosensitive drum 101 in the main scanning direction.

The photosensitive drum 101 as an electrostatic latent image carrier (photosensitive body) is rotated clockwise by a motor 115. With the rotation thereof, the photosensitive surface of the photosensitive drum 101 moves in the sub-scanning direction perpendicular to the main scanning direction, relative to the light beam 103. Above the photosensitive drum 101, a charging roller 102 for uniformly charging the surface of the photosensitive drum 101 is disposed so as to contact the surface. Then the surface of the photosensitive drum 101 charged by the charging roller 102 is exposed to the light beam 103 under scanning by the optical scanning unit 100.

As described previously, the light beam 103 is modulated based on the image data Di and an electrostatic latent image is formed on the surface of the photosensitive drum 101 under irradiation with this light beam 103. This electrostatic latent image is developed into a toner image by a developing unit 107 disposed so as to contact the photosensitive drum 101 downstream in the rotating direction of the photosensitive drum 101 from the irradiation position of the light beam 103.

The toner image developed by the developing unit 107 is transferred onto a sheet 112 being a transfer medium, by a transfer roller 108 opposed to the photosensitive drum 101 below the photosensitive drum 101. Sheets 112 are stored in a sheet cassette 109 in front of (i.e., on the right side in FIG. 12) of the photosensitive drum 101, but sheet feed can also be implemented by hand feeding. A sheet feed roller 110 is disposed at an end of the sheet cassette 109 and feeds each sheet 112 in the sheet cassette 109 into the conveyance path.

The sheet 112, onto which the toner image not fixed yet was transferred as described above, is further carried to a fixing unit located behind the photosensitive drum 101 (i.e., on the left side in FIG. 12). The fixing unit is composed of a fixing roller 113 having a fixing heater (not illustrated) inside and a pressing roller 114 disposed in press contact with the fixing roller 113 and heats while pressing the sheet 112 thus conveyed from the transfer part, in the nip part between the fixing roller 113 and the pressing roller 114 to fix the unfixed toner image on the sheet 112. Sheet discharge rollers 116 are disposed further behind the fixing roller 113 to discharge the fixed sheet 112 to the outside of the image-forming apparatus.

Although not illustrated in FIG. 12, the print controller 111 also performs control of each section in the image-forming apparatus, including the motor 115, and control of the polygon motor etc. in the optical scanning unit described above, in addition to the conversion of data described above.

According to the present invention as described above, in order to efficiently intercept the reflected light from the surface not associated with the image while maintaining the rays in the portion associated with the formation of the image in the polygon mirror, the tip portion of the shield member is positioned in the certain range determined by the inside diameter of the polygon and the focal length of the fθ lens, whereby the flare is cut efficiently. This permits a good image to be formed without flare.

What is claimed is:

1. An optical scanning apparatus comprising:
   a scanning mirror having a plurality of reflective facets for deflectively reflecting a first beam emitted from a laser light source;
   an fθ lens for focusing a second beam deflectively reflected by a reflective facet of said scanning mirror in a spot shape on an image plane; and
   a shield member for intercepting a third beam reflected by a reflective facet of said scanning mirror adjacent to the reflective facet deflectively reflecting the second beam,
   wherein a width in a main scanning direction of the first beam incident to said scanning mirror is wider than a width of the reflective facets of said scanning mirror in the main scanning direction.

2. The optical scanning apparatus according to claim 1, wherein the first beam travels through said fθ lens to be incident to said scanning mirror and the first beam incident to said scanning mirror is present within a plane made by a rotation axis of said scanning mirror and an optical axis of the fθ lens.

3. The optical scanning apparatus according to claim 1, wherein the first beam incident to said scanning mirror is present within a plane made by a rotation axis of said scanning mirror and an optical axis of said fθ lens.

4. The optical scanning apparatus according to claim 3, wherein an origin is set at the center of the rotation axis of said scanning mirror, an x-coordinate axis is taken along an optical axis of the first beam of incident rays, the positive direction of the x-coordinate axis is taken along a direction in which the second beam and third beam of reflected rays from said scanning mirror travel, and a y-coordinate axis is taken along the main scanning direction, a distal end of said shield member is located in the range defined by the following equation between the reflective facet of said scanning mirror and a ray output surface of the fθ lens:

$$\alpha x + \beta \leq |y| \leq \alpha' x + \beta'$$

$$\alpha = \tan 2\theta_0$$

$$\beta = (\sec 2\theta_0) \times (a \cos \theta_0 - 2\phi \sin \theta_0)/2$$

$$\alpha' = \tan 2\theta_1$$

$$\beta' = (-\sec 2\theta_1) \times (a \cos \theta_1 + 2\phi \sin \theta_1)/2$$

$$\theta_0 = y_0/2f$$

$$\theta_1 = 2\pi/n - \theta_0$$

$$a = \phi \tan(\pi/n),$$

where n is the number of reflective facets of said scanning mirror, f a focal length of said fθ lens, $y_0$ a maximum image height in the main scanning direction, and φ a diameter of an inscribed circle to said scanning mirror.

5. The optical scanning apparatus according to claim 4, wherein said shield member is means for positioning said fθ lens.

6. The optical scanning apparatus according to claim 4, wherein said shield member is a portion of a lens surface in a noneffective image portion of said fθ lens, the noneffective image portion being treated by a light-intercepting treatment.

7. The optical scanning apparatus according to claim 4, wherein said shield member is formed so as to be integral with an optical box.

8. The optical scanning apparatus according to claim 3, wherein an origin is set at the center of the rotation axis of said scanning mirror, an x-coordinate axis is taken along an optical axis of the first beam of incident rays, the positive direction of the x-coordinate axis along a direction in which the second beam and third beam of reflected rays from said scanning mirror travel, and a y-coordinate axis is taken along the main scanning direction, a distal end of said shield member is located in a range defined by the following equation between the fθ lens and the image plane:

$$\alpha x + \beta \leq |y| \leq \alpha' x + \beta'$$

$$\alpha = 2(2f\theta_0 \cos 2\theta_0 + \phi \sin \theta_0 - x_1 \sin 2\theta_0)/(\cos \theta_0 + 2f \cos 2\theta_0)$$

$$\beta = 2f\theta_0 - [2(f + x_1)(2f\theta_0 \cos 2\theta_0 + \phi \sin \theta_0 - x_1 \sin 2\theta_0)/(\cos \theta_0 + 2f \cos 2\theta_0)]$$

$$\alpha' = 2(2f\theta_1 \cos 2\theta_1 + \phi \sin \theta_1 - x_1 \sin 2\theta_0)/(-\cos \theta_1 + 2f \cos 2\theta_1)$$

$$\beta' = 2f\theta_1 + [2(f + x_1)(2f\theta_1 \cos 2\theta_1 + \phi \sin \theta_1 - x_1 \sin 2\theta_1)/(\cos \theta_1 - 2f \cos 2\theta_1)]$$

$$\theta_0 = y_0/2f$$

$$\theta_1 = 2\pi/n - \theta_0$$

$$a = \phi \tan(\pi/n),$$

where n is the number of reflective facets of said scanning mirror, f a focal length of the fθ lens, $y_0$ a maximum image height in the main scanning direction, φ a diameter of an inscribed circle to said scanning mirror, and $x_1$ a position of a rear principal plane of said fθ lens.

9. The optical scanning apparatus according to claim 1, wherein said shield member surrounds a periphery of said scanning mirror.

10. The optical scanning apparatus according to claim 1, wherein said shield member is means for positioning said fθ lens.

11. The optical scanning apparatus according to claim 1, wherein said shield member is a portion of a lens surface in a noneffective image portion of said fθ lens, the noneffective image portion being treated by a light-intercepting treatment.

12. The optical scanning apparatus according to claim 1, wherein said shield member is formed so as to be integral with an optical box.

13. An image-forming apparatus comprising:
    an optical scanning apparatus as set forth in any one of claims 1 to 12;
    a photosensitive body placed on a surface to be scanned;

a developing unit for developing an electrostatic latent image formed on said photosensitive body with the beam under scanning by said optical scanning apparatus, into a toner image;

a transfer unit for transferring the developed toner image onto a transfer medium; and a fixing unit for fixing the transferred toner image on the transfer medium.

14. An image-forming apparatus comprising:

an optical scanning apparatus as set forth in any one of claims 1 to 12; and a printer controller for converting code data supplied from an external device into an image signal and supplying the image signal to said optical scanning apparatus.

* * * * *

UNITED STATES PATENT AND TRADEMARK OFFICE
CERTIFICATE OF CORRECTION

PATENT NO. : 6,501,586 B1
DATED : December 31, 2002
INVENTOR(S) : Hidemi Takayama It is certified that error appears in the above-identified patent and that said Letters Patent is hereby corrected as shown below:

Column 3,
Line 53, "firs" should read -- first --.

Column 9,
Line 53, "the range" should read -- a range --; and
Line 55, "of the" should read -- of said --.

Column 10,
Line 33, "+φ sin $\theta_0$0" should read -- +φ sin $\theta_0$ --.
Line 36, "(--cos$\theta_1$" should read -- (-cos$\theta_1$ --.

Signed and Sealed this

Thirtieth Day of December, 2003

JAMES E. ROGAN
*Director of the United States Patent and Trademark Office*